June 29, 1965  L. D. HAGENBOOK  3,191,763
HEAT SHIELDED SHAKER CONVEYOR TROUGH LINE
Filed April 16, 1963  2 Sheets-Sheet 1
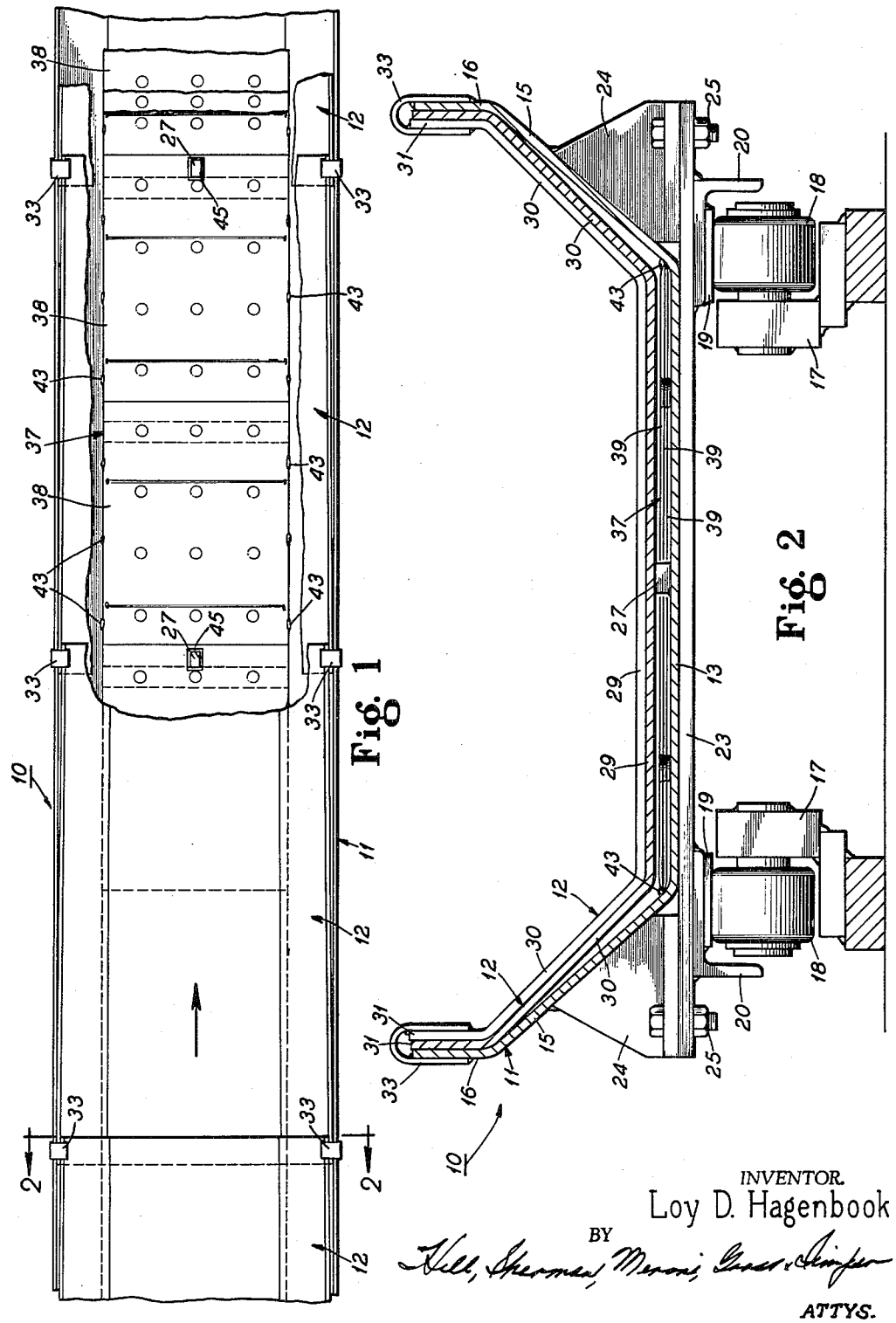
INVENTOR.
Loy D. Hagenbook
BY
ATTYS.

June 29, 1965  L. D. HAGENBOOK  3,191,763
HEAT SHIELDED SHAKER CONVEYOR TROUGH LINE
Filed April 16, 1963  2 Sheets-Sheet 2

INVENTOR.
Loy D. Hagenbook
BY
*ATTYS.*

United States Patent Office 3,191,763
Patented June 29, 1965

3,191,763
HEAT SHIELDED SHAKER CONVEYOR
TROUGH LINE
Loy D. Hagenbook, Chicago, Ill., assignor to Goodman Manufacturing Company, Chicago, Ill., a corporation of Illinois
Filed Apr. 16, 1963, Ser. No. 273,436
11 Claims. (Cl. 198—220)

This invention relates to improvements in shaker conveyor trough lines adapted to transport heavy hot material.

In shaker conveyor trough lines used in steel mills, foundries and like places, for transporting hot heavy abrasive material, the hot material is usually conveyed along liner troughs for a shaker conveyor trough line, and the high degree of heat of the material conveyed is conducted to the trough line by conduction and radiation. Where the material is extremely hot the bottom of the underlying trough of the trough line is heated to a much higher temperature than the side walls of the trough. This causes the bottom of the trough to warp with the resultant breaking of the welds and frequent lifting the trough from its guide and support rollers by the warping effect of the trough.

In order to alleviate this problem, the trough line has been provided with liners in which the bottoms of the liners are spaced from the bottom of the underlying trough of the trough line to provide an air insulating space between the bottom of the trough liner troughs and the underlying trough. Such liners have provided satisfactory at moderate temperatures up to about 250° F., where the only heating of the underlying trough is by conduction, which is relatively small because of the small contact between the underlying trough and the hot liner. Where the temperature of the material conveyed, however, is substantially above 250° F. and in the range of 500° F. and over, the bottom of the underlying trough in addition to being heated by conduction is also heated by radiation, causing the underlying trough bottom to become much hotter than its side walls with the result warping of the trough bottom.

A principal object of the present invention is to overcome the foregoing problems by utilizing a heat shield between the bottom of the liner trough and the underlying trough and radiating the heat waves received from the adjacent surface of the liner trough in all directions, and returning part of the heat to the source and passing on the remaining heat to the bottom trough section, with a substantial reduction in the heat passed on.

Another object of the invention is to provide an improved form of shaker conveyor trough line for conveying hot material which may be abrasive, having a liner trough secured to the sides of an underlying trough section, with its bottom spaced above the bottom of the underlying trough section in which a heat shield extends along the space between the trough section and reduces the radiation of heat to the underlying trough section in stages.

A further object of the invention is to provide a simplified and improved means for preventing warping of the bottom of a shaker conveyor trough line for conveying hot abrasive material by utilizing a liner for the trough section, carrying the hot abrasive material and by providing at least two layers of thin heat radiating material in the space between the bottom of the conveyor trough section and its liner.

A still further object of the invention is to provide an improved form of shaker conveyor trough line for carrying hot material, in which a liner trough extends along and is spaced above the top surface of the bottom of an underlying trough of the trough line, and in which a heat shield is placed between the liner trough and the underlying trough and is in the form of at least two layers of thin heat radiating material spaced from one another and from the troughs.

A still further object of the invention is to provide an improved form of shaker conveyor trough for conveying hot abrasive materials in which a liner trough is nested within an underlying trough and spaced from the top surface of the bottom thereof and a plurality of thin heat barrier metal sheets of dimpled material are spaced between the top surface of the bottom of the underlying trough and the liner trough and spaced from each other by the dimpled portion thereof, to radiate the heat from the liner trough in all directions and return part of the heat to the source and pass the remaining heat onto the bottom trough, with a substantial heat reduction at each stage of radiation.

These and other objects of the invention will appear from time to time as the following specification proceeds and with reference to the accompanying drawings wherein:

FIGURE 1 is a fragmentary top plan view of a portion of a shaker conveyor trough line constructed in accordance with the principles of the present invention, with part of the liner trough broken away in order to show certain details of the heat shield between the liner trough and main trough of the trough line;

FIGURE 2 is a transverse sectional view taken substantially along line II—II of FIGURE 1;

Figure 3:
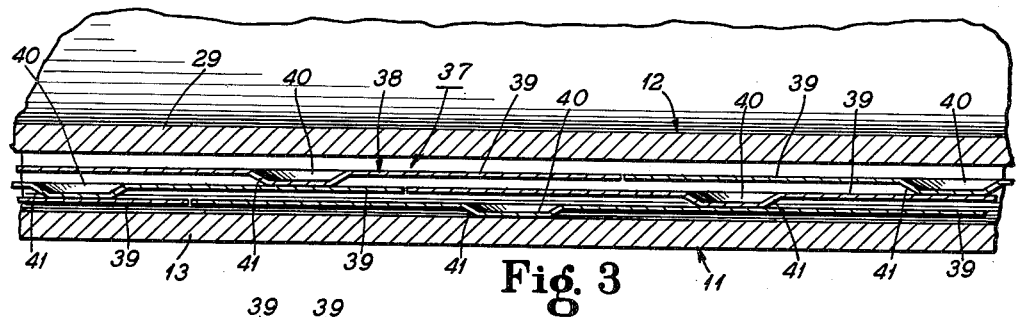
FIGURE 3 is an enlarged partial fragmentary longitudinal sectional view taken along a portion of the liner and underlying troughs.

In the embodiment of the invention illustrated in the drawings, I have shown in FIGURE 1 a portion of a shaker conveyor pan or trough line 10. The trough line 10 includes an underlying trough 11, which may extend for the length of the trough line and take the impact forces of the shaker conveyor. A plurality of liner pans or troughs 12, 12 are shown as being nested within the undertroughs 12, 12 are shown as being nested within the underlying trough 11 and connected thereto.

The underlying trough 11 may be reciprocably driven by a conventional shaker conveyor drive mechanism, (not shown) to effect the movement of material along the trough line in the direction of the arrow shown in FIGURE 1. The underlying trough 11 has a relatively flat bottom 13 having inclined side walls 15, 15 flaring outwardly and upwardly from opposite sides of said bottom and terminating into parallel upright connector flanges 16, 16, extending for the length of said underlying trough.

The underlying trough 11 is mounted on a series of spaced roller supports 17, 17, spaced at suitable intervals along the trough 11. The roller supports 17, 17 include aligned laterally spaced rollers 18, 18 mounted for rotatable movement about axes extending transversely of the trough line and engaged by wear strips 19, 19 extending along the bottoms of angle retainers 20, 20. The angle retainers 20, 20 have vertical legs spaced outwardly of the rollers 18, 18 and serving to retain the underlying trough 11 to said rollers. The angle retainers 20, 20 extend along the bottom of a cross plate 23, supporting the underlying trough 11, and extending across and along the bottom of said trough for a portion of the length thereof. As shown in FIGURE 2, the angle brackets 24, 24 have engagement with the inclined side walls 15, 15 of the underlying trough 11 on their vertical legs and are welded or otherwise secured thereto. The horizontal legs of the angle brackets 24, 24 abut the top surface of the cross plate 23, and are shown as being bolted thereto, as by nuts and bolts 25.

The underlying trough 11 also has a plurality of spacer lugs 27, 27 spaced along the bottom thereof and projecting upwardly therefrom and forming a support for bottoms 29 of the receiving end portions of the overlapped liner troughs 12. The spacer lugs 27 are located at the overlapping joints between the liner troughs and provide an air space between the underlying trough 11 and the bottoms of the liner troughs 12.

Each liner trough 12 has outwardly flaring side walls 30, 30 flaring outwardly from the bottom 29 and generally conforming to the flared side walls 15, 15 of the underlying trough 11. The flared side walls 30, 30 terminate at their upper ends into upright flanges 31, 31 generally conforming to the flanges 16, 16 and forming connector flanges for the liner trough 12. The liner troughs 12 also slightly converge from their receiving to their discharge ends to accommodate the discharge end of one liner trough to be nested within the receiving end of the next adjacent liner trough.

The connectors for connecting the liner troughs 12 to the underlying trough 11 are shown as being in the form of a series of downwardly facing U-shaped clips 33 extending over the tops of the connector flanges 16 and 31, and downwardly along said flanges. As shown in FIGURES 1 and 2, the clips 33 extend downwardly along the outer sides of the flanges 16 of the underlying trough and downwardly along the inner sides of the flanges 31 of the nested or overlapping liner trough, and have no connection with the adjacent end of the underlapped liner trough. This accommodates longitudinal expansion and contraction of the underlapped trough with respect to the overlapped trough. The clips 33 may be secured to the associated connector flanges 16 and 31 as by welding, or by any other suitable form of connecting means.

The space between the bottoms of the liner troughs 12 and the top surface of the bottom of the underlying trough 11 contains a heat shield 37, shown as being in the form of a plurality of longitudinally aligned heat barriers 38. Each heat barrier comprises a plurality of stacked thin heat barrier sheets 39, which may be made from steel or any other suitable material having heat radiating characteristics.

As shown in FIGURE 3, each heat barrier 38 has three heat barrier sheets 39 in the space between the underlying trough and the liner trough, and each one of these sheets is dimpled as indicated by reference character 40. The dimpled portions 40 open upwardly to form downward projections 41, projecting downwardly from the sheets 39 to space the sheets 39 apart, and to space the bottom sheets above the top surface of the bottom of the underlying trough 11.

The dimples are uniformly spaced along the sheets, but the sheets are longitudinally staggered with respect to each other to stagger the dimples of the various sheets and to thereby assure that the downwardly projecting portions 41 of said dimples will rest on a plane surface and space the sheets apart.

Figure 4:
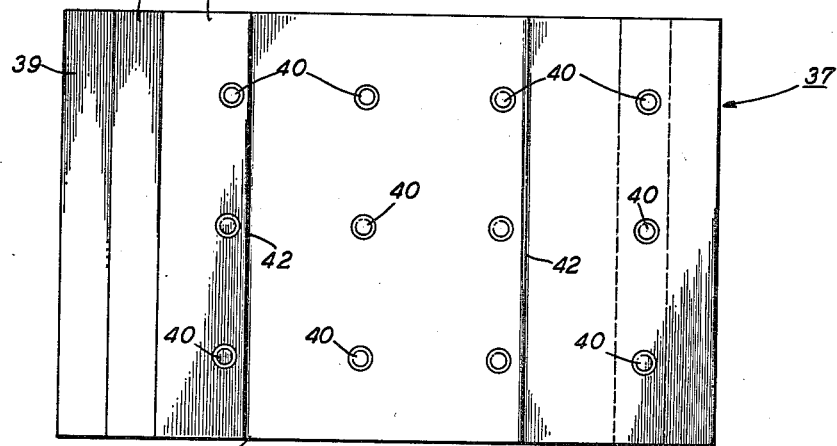
FIGURE 4 is a plan view of a form of heat shield member that may be used to carry out the invention.
Figure 5:
FIGURE 5 is a view in side elevation of the heat shield member shown in FIGURE 4.

As shown in FIGURES 4 and 5, the heat barrier sheets are depressed intermediate the ends thereof, along lines extending transversely thereof and are welded together by bead welds extending thereacross and indicated generally by reference character 42. The heat barrier sheets 9 being sandwiched and welded together as shown in FIGURES 4 and 5, with each lower heat barrier sheet spaced in advance of the next lower heat barrier sheet, are then placed along the top surface of the bottom 13 of the underlying trough 11 in lapping relation with respect to each other and are spot welded to the top surface of the bottom of the trough 11 along opposite sides thereof, at the lower portions of the flared side walls 15 of the trough as indicated by reference character 43 in FIGURES 1 and 2.

It should here be understood that the heat barrier sheets 39 are paper thin and a lower heat barrier sheet will generally conform to the inclination of the flared side wall 15 along its opposite sides and adjacent the lower margins of said side walls, at their juncture with the bottom 13 and the next adjacent upper and top heat barrier will be pressed downwardly at the spot welds and for the length of the heat barrier.

The heat shield 37 formed by the sandwiched heat barrier sheets is provided with rectangular openings 45 therein to accommodate the spacer lugs 27 to pass therethrough.

While I have herein shown the heat shield 37 as being formed from three sandwiched heat barrier sheets, it should be understood that the number of sheets may be varied in accordance with the requirements necessary to shield the bottom 13 of the underlying trough 11 from radiant heat. Where the material conveyed is at a red heat, two heat barrier sheets are all that are usually required to radiate the heat and maintain the temperatures of the side walls 15 at substantially the temperature of the bottom 13. Where, however, the material conveyed is so hot as to be incandescent, a heat shield having three heat barrier sheets has been found sufficient to hold down the heating of the bottom underlying trough so its temperature is at generally the same level as the temperature of the side walls of the trough. Where the material conveyed is at such temperatures, and the heat barrier is made up of three heat barrier sheets, no warping has occurred in the underlying trough.

Where, however, a heat barrier has not been used, the differential in temperature of the underlying trough bottom as compared with its side walls may be in excess of 100° F., with the result that the underlying trough has warped so badly as to break its welds and cause the trough to lift from its guide and support rollers, with a resultant breakdown in the conveyor.

It should be further understood that the heat shield serves to shield the bottom 13 of the underlying trough 11 from radiant heat and that in doing this each heat barrier sheet receives the heat waves from an adjacent surface and radiates the heat waves in all directions, returning part of the heat to the source and passing the remaining part of the heat onto the next surface, with a substantial heat reduction at each stage.

While I have herein shown and described one form in which my invention may be embodied, it should be understood that various variations and modifications in the invention may be attained without departing from the spirit and scope of the novel concepts thereof.

I claim as my invention:

1. In a shaker conveyor trough line, an underlying trough extending for the length of the trough line, a liner trough nested within and having a bottom spaced above the top surface of the bottom of said underlying trough, a heat shield between said liner trough and said underlying trough, said heat shield comprising a layer of thin heat radiating sheet material extending along and spaced between the bottom of said liner trough and the top surface of the bottom of said underlying trough.

2. In a shaker conveyor trough line, an underlying trough extending for the length of the trough line, a liner trough nested within and having a bottom spaced above the top surface of the bottom of said underlying trough, a heat shield between said liner trough and said underlying trough, said heat shield comprising a plurality of layers of thin heat radiating sheets having dimples therein forming projections projecting from said sheets and generally spacing said sheets from one another and from the top surface of the bottom of said underlying trough.

3. In a shaker conveyor trough line, an underlying trough extending for the length of the trough line, a liner trough nested within and having a bottom spaced above the top surface of the bottom of said underlying trough, a heat shield between said liner trough and said underlying trough, said heat shield comprising at least two layers of paper thin steel sheets having dimples opening at the top sides thereof and forming downwardly projecting projections, generally spacing said sheets from one another and from said underlying trough.

4. A shaker conveyor trough for conveying hot abrasive material comprising an underlying trough, a liner trough nested within and having a bottom spaced above the top surface of the bottom of said underlying trough, and means maintaining the temperature of the bottom of said underlying trough at substantially the temperature of the side walls of said trough upon the conveying of hot material along said liner trough, comprising a heat shield between said liner trough and said underlying trough, said heat shield comprising at least two layers of thin heat radiating sheet material generally spaced from one another and from said troughs.

5. A shaker conveyor trough for conveying hot abrasive material, comprising an underlying trough having a bottom and side walls extending upwardly therefrom, a liner trough nested within said underlying trough and extending therealong and having a bottom spaced above the top surface of the bottom of said underlying trough, and means maintaining the temperature of the bottom of said underlying trough at substantially the temperature of the side walls of said underlying trough upon the conveying of hot abrasive material along said liner trough, comprising a heat shield extending along the top surface of the bottom of said underlying trough and spaced beneath the bottom of said liner trough and comprising a plurality of layers of thin heat radiating material generally spaced from each other and from said troughs, and means securing said heat shield to said underlying trough along the longitudinal margins of said heat shield.

6. A shaker conveyor trough for conveying hot abrasive material comprising an underlying trough having a bottom and side walls extending upwardly therefrom and along opposite sides thereof, a liner trough nested in and having a bottom spaced above the top surface of the bottom of said underlying trough and extending therealong, and means maintaining the temperature of the bottom of said underlying trough at substantially the temperature of the side walls of said trough upon the conveying of hot material along side liner trough comprising a heat shield between the bottom of said liner trough and the top surface of the bottom of said underlying trough and comprising a plurality of layers of thin heat radiating sheet material, each sheet having dimples formed therein forming projecting portions projecting from the bottom thereof and generally spacing said layers from each other and from the top surface of the bottom of said underlying trough.

7. A shaker conveyor trough for conveying hot abrasive material comprising an underlying trough having a bottom and side walls extending upwardly therefrom and along opposite sides thereof, a liner trough nested in and having a bottom spaced above the bottom of said underlying trough and extending therealong, and means maintaining the temperature of the bottom of said underlying trough at substantially the temperature of the side walls of said trough upon the conveying of hot material along said liner trough comprising a heat shield between the bottom of said liner trough and the top surface of the bottom of said underlying trough and comprising a plurality of layers of thin heat radiating sheet material, each having dimples formed therein forming projecting portions projecting from the bottom thereof and generally spacing said layers from each other and from the top surface of the bottom of said underlying trough, welding means securing said layers together at longitudinally spaced points, and other welding means securing said layers to the top surface of the bottom of said underlying trough along the longitudinal margins of said heat shield.

8. In a shaker conveyor trough line, an underlying trough extending for the length of the trough line, a plurality of liner troughs extending along said underlying trough and nested therein, each liner trough having a discharge end overlapping the receiving end of the next adjacent liner trough, means securing the overlapping discharge end portion of each liner trough to said underlying trough, a heat shield maintaining the bottom of said underlying trough at substantially the temperature of the side walls of said trough upon the conveying of hot materials along said liner trough, said heat shield comprising a plurality of longitudinally aligned heat barriers extending for the length of said underlying trough in the space beneath the bottom of said liner trough, each heat barrier comprising at least two layers of thin heat radiating heat barrier sheets generally spaced from each other and from said troughs and extending in generally end to end relation with respect to each other.

9. In a shaker conveyor trough line, an underlying trough extending for the length of the trough line, a plurality of liner troughs extending along said underlying trough and nested therein, each liner trough having a discharge end overlapping the receiving end of the next adjacent liner trough, means securing the overlapping discharge end portion of each liner trough to said underlying trough, a heat shield maintaining the bottom of said underlying trough at substantially the temperature of the side walls of said trough upon the conveying of hot materials along said liner trough, said heat shield comprising a plurality of longitudinally aligned heat barriers extending for the length of said underlying trough in the space beneath the bottom of said liner trough, each heat barrier comprising a plurality of layers of thin heat radiating heat barrier sheets, each sheet having dimples formed therein forming projections projecting from one side of said sheet, and said projections of each sheet being spaced from the dimples of the next adjacent sheet to maintain an air space between said sheets and between the bottom of the lower of said sheets and the top surface of the bottom of said underlying trough, and means retaining said heat barriers to the top surface of the bottom of said underlying trough in generally end to end relation with respect to each other.

10. In a shaker conveyor trough line, an underlying trough extending for the length of the trough line, a plurality of liner troughs extending along said underlying trough and nested therein, each liner trough having a discharge end overlapping the receiving end of the next adjacent liner trough, means securing the overlapping discharge end portion of each liner trough to said underlying trough, a heat shield maintaining the bottom of said underlying trough at substantially the temperature of the side walls of said trough upon the conveying of hot materials along said liner trough, said heat shield comprising a plurality of longitudinally aligned heat barriers extending for the length of said underlying trough in the space beneath the bottom of said liner trough, each heat barrier comprising a plurality of layers of thin heat radiating heat barrier sheets, each sheet having uniformly spaced dimples formed therein forming projections projecting from the bottoms thereof and generally spacing said sheets apart and from the top surface of the bottom of said underlying trough, each upper sheet being longitudinally offset in advance of the next adjacent lower sheet to position the projecting portions of the dimples to engage the plane surfaces of said sheets, and means welding said sheets together at spaced apart points and to the top surface of the bottom of said underlying trough along the longitudinal margins of said sheets.

11. In a shaker conveyor trough line, an underlying trough extending for the length of the trough line, a plurality of liner troughs extending along said underlying trough and nested therein, each liner trough having a discharge end overlapping the receiving end of the next adjacent liner trough, means securing the overlapping discharge end portion of each liner trough to said underlying trough, a heat shield maintaining the bottom of said underlying trough at substantially the temperature of the side walls of said trough upon the conveying of hot materials along said liner trough, said heat shield comprising a plurality of longitudinally aligned heat barriers extending for the length of said underlying trough in the space beneath the bottom of said liner trough, each heat barrier comprising a plurality of layers of thin heat radiating sheets, each sheet having uniformly spaced dimpled portions forming projections projecting from the bottoms thereof and generally spacing said sheets apart and from the top surface of the bottom of said underlying trough, each upper sheet being longitudinally offset along the next adjacent lower sheet to position the projecting portions of the dimpled portions of said sheets to engage the plane surfaces of the top surface of the said sheets and of bottom of the underlying trough, said sheets being welded together at spaced points and to the top surface of the bottom of said underlying trough adjacent the longitudinal margins of said sheets, and the projecting end portions of the sheets of one barrier lapping the upwardly facing end portions of the sheets of the next adjacent barrier to provide a generally plane top surface for said barriers in the space between the bottom of said liner troughs and the top surface of the bottom of said underlying trough and generally out of contact therewith.

References Cited by the Examiner
UNITED STATES PATENTS 2,179,635　11/39　Kimmel _____ 165—134 X
2,940,743　6/60　Walpole.

SAMUEL F. COLEMAN, *Primary Examiner.*
EDWARD A. SROKA, *Examiner.*

UNITED STATES PATENT OFFICE
CERTIFICATE OF CORRECTION

Patent No. 3,191,763

June 29, 1965

Loy D. Hagenbook

It is hereby certified that error appears in the above numbered patent requiring correction and that the said Letters Patent should read as corrected below.

Column 1, line 40, for "result" read -- resultant --; column 7, line 11, after "surfaces" insert -- of said sheets and --; same line 11, strike out "said sheets and of".

Signed and sealed this 1st day of February 1966.

(SEAL)
Attest:

ERNEST W. SWIDER
Attesting Officer

EDWARD J. BRENNER
Commissioner of Patents